(12) United States Patent
Krumm et al.

(10) Patent No.: US 7,397,357 B2
(45) Date of Patent: Jul. 8, 2008

(54) SENSING AND ANALYSIS OF AMBIENT CONTEXTUAL SIGNALS FOR DISCRIMINATING BETWEEN INDOOR AND OUTDOOR LOCATIONS

(75) Inventors: John C. Krumm, Redmond, WA (US); Eric J. Horvitz, Kirkland, WA (US); Ramaswamy Hariharan, Irvine, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/558,410

(22) Filed: Nov. 9, 2006

(65) Prior Publication Data

US 2007/0085673 A1    Apr. 19, 2007

Related U.S. Application Data

(63) Continuation of application No. 10/994,550, filed on Nov. 22, 2004, now Pat. No. 7,327,245.

(51) Int. Cl.
*G08B 23/00* (2006.01)

(52) U.S. Cl. .................. 340/501; 340/506; 340/517

(58) Field of Classification Search ........... 340/500, 340/501, 506, 517, 524, 539.13, 539.22, 340/539.28, 541; 455/41.2, 550.1, 567; 715/716, 719

See application file for complete search history.

(56) References Cited

U.S. PATENT DOCUMENTS

| | | | |
|---|---|---|---|
| 5,212,430 A | 5/1993 | Jartyn | |
| 5,395,042 A | 3/1995 | Riley et al. | |
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,466,232 B1 | 10/2002 | Newell et al. | |

(Continued)

FOREIGN PATENT DOCUMENTS

WO    9800787    1/1998

(Continued)

OTHER PUBLICATIONS

Andy Harter, et al., A Distributed Location System for the Achive Office, IEEE Network, 1994, pp. 62-70.

(Continued)

*Primary Examiner*—Van T. Trieu
(74) *Attorney, Agent, or Firm*—Amin, Turocy & Calvin, LLP

(57) ABSTRACT

Methods and systems that determine automatically the likelihood that a device is inside or outside of a structure or building. The system uses one or more sensors to detect ambient conditions, and make the determination. The inference can be used to save power or suppress services from certain devices, which are irrelevant, cannot be used effectively, or do not function under certain circumstances. In support thereof, the system includes one or more context sensors that measure parameters associated probabilistically with the context of a device. A context computing component considers one or more context sensors and facilitates determination of ideal actions, policies, and situations associated with the device. A service provided by the subject invention is the inference from one or more available observations the probability that the device is inside versus outside.

18 Claims, 14 Drawing Sheets

U.S. PATENT DOCUMENTS

| | | | |
|---|---|---|---|
| 6,513,046 | B1 | 1/2003 | Abbott, III et al. |
| 6,549,915 | B2 | 4/2003 | Abbott, III et al. |
| 6,675,081 | B2 | 1/2004 | Shuman et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,816,686 | B2 | 11/2004 | Hooper et al. |
| 6,842,877 | B2 | 1/2005 | Robarts et al. |
| 6,844,827 | B2 | 1/2005 | Flick |
| 6,850,252 | B1 | 2/2005 | Hoffberg |
| 6,868,325 | B2 * | 3/2005 | Menon et al. ............... 701/100 |
| 6,954,657 | B2 | 10/2005 | Bork et al. |
| 7,027,773 | B1 | 4/2006 | McMillin |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III, et al. |
| 2005/0034078 | A1 | 2/2005 | Abbott et al. |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Inactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications , In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated informationa retrieval system, The Proceedings of The First International Conference on The Pratical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Ser. No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

SENSING AND ANALYSIS OF AMBIENT CONTEXTUAL SIGNALS FOR DISCRIMINATING BETWEEN INDOOR AND OUTDOOR LOCATIONS

CROSS-REFERENCE TO RELATED APPLICATION

This application is a continuation of U.S. patent application Ser. No. 10/994,550, filed on Nov. 22, 2004, now U.S. Pat. No. 7,327,245, and entitled SENSING AND ANALYSIS OF AMBIENT CONTEXTUAL SIGNALS FOR DISCRIMINATING BETWEEN INDOOR AND OUTDOOR LOCATIONS, the entirety of which is incorporated herein by reference.

TECHNICAL FIELD

This invention is related to sensing mechanisms, and more specifically, sensing mechanisms employed in portable devices to sense changes in device location.

BACKGROUND OF THE INVENTION

As computing moves off the desktop into the hands of mobile users, it is becoming more important for mobile devices to be aware of the user's context. Important pieces of context include the user's location, activities, nearby people and devices, and mode of transportation, if any. This knowledge can in turn be used by mobile devices to display reminders, to configure themselves for use with other devices, and to behave in a way that is appropriate for the surrounding environment (e.g., turn off cell phone ringer) or subcontexts of the surrounding environment such as whether particular states or transitions among states are occurring within the environment.

One significant aspect of context concerns whether or not the user (and the device) is inside or outside of a building or structure. For example, knowledge of such information can be used to facilitate determining the user's location (e.g., in a building or structure, in a particular building or structure, or in one of a set of known buildings or structures) and the user's mode of transportation (e.g., in a bus, car or airplane). Such knowledge can also be used to conserve power on systems that do not provide useful services inside buildings or outside. For example, because GPS typically fails to operate inside because satellite signals are not available inside, determination of the likelihood that a user is inside can be used to turn off a GPS system or put the system into a mode where it probes for satellite signals periodically so as to conserve the batteries of the GPS system.

One way to make an inside/outside determination would be to use a digital map of building footprints along with knowledge of the user's location or recent location. However, for most buildings such a map does not exist. Additionally, location data is not necessarily available, especially inside a structure where GPS typically fails.

In view of the foregoing, there is an unmet need for an improved technique to glean information regarding such inside/outside context of a device and/or an individual.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises architecture for automatically determining and/or inferring if a device or individual is inside or outside is provided. The system can employ one or more sensors to detect ambient conditions, and make such determination and/or inference. The system can include one or more context sensors that measure parameters of a first context of a device. A context computing component interfaces to the one or more context sensors and facilitates determination of a change from the first context to a second context. Knowledge of such context transition can for example be used to save power in certain devices, which may not be used or even function in certain states (e.g., darkness).

In another aspect of the subject invention, the system generates probability distributions which are mathematically combined to ultimately derive a probability inference that the device is inside or outside.

In yet another aspect, the sensors can include devices suitable for measuring temperature, light frequency, radio frequency (e.g., 60 Hz or 50 Hz electromagnetic signals emitted from local power lines, systems, lights, and appliances, IEEE 802.11 Wi-Fi signals, AM and FM radio, or GPS satellite signals), capturing images or image flows, location data (e.g. GPS location analysis), pressure, humidity, and audio signals.

In still another aspect thereof, a machine learning and/or inferential component enable a probabilistic and/or statistical-based analysis to prognose or infer an action that a user desires to be automatically performed based in part on the likelihood that a user is indoors or outdoors.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
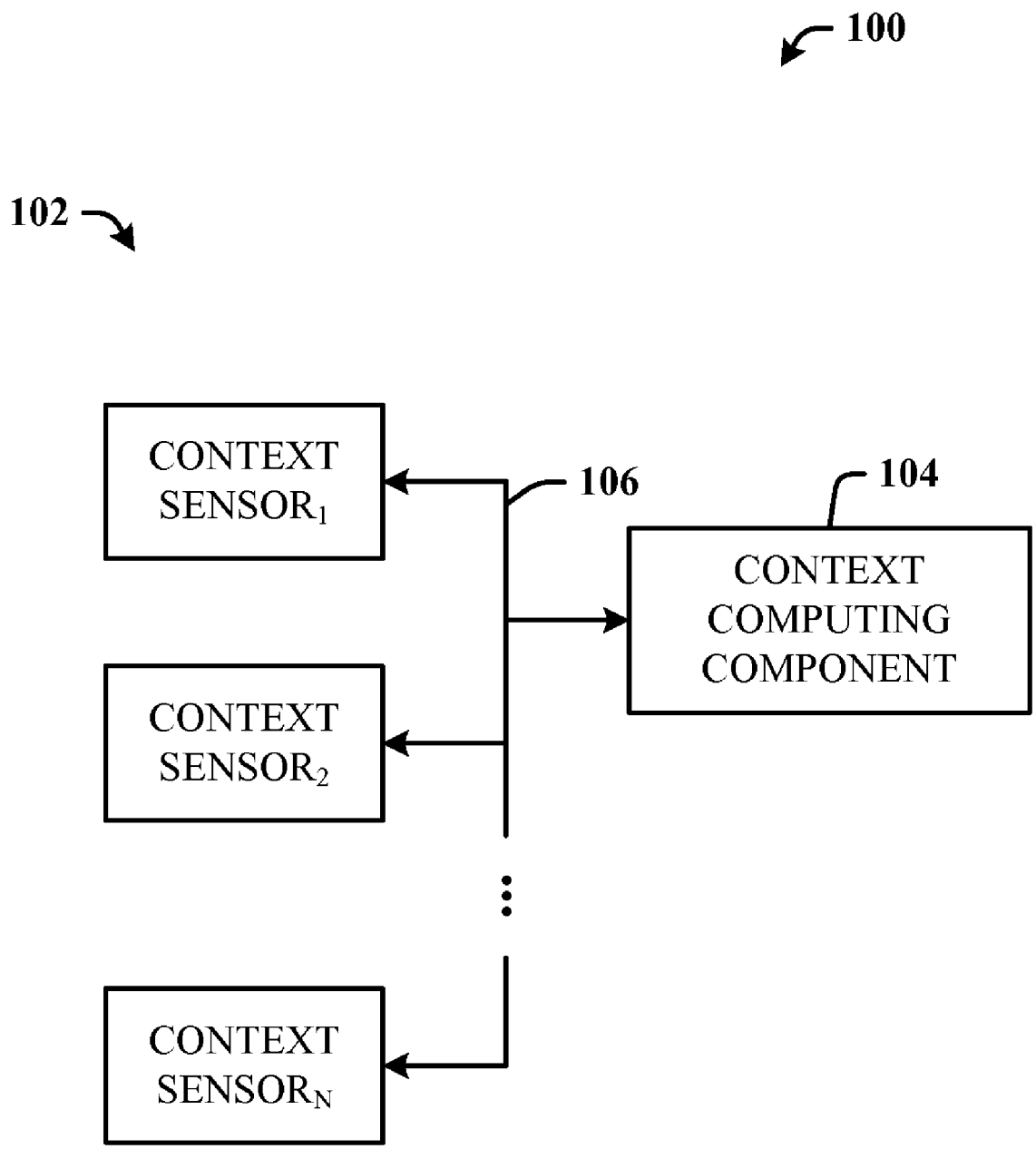
FIG. 1 illustrates a system that determines device context in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Context Classification

A technique for inside/outside classification that exploits one or more sensor measurements on which to base such classification is described herein. For example, the fact that inside environments are normally temperature-controlled can be exploited as one means for making this determination. If a mobile device can measure ambient temperature, and if it has knowledge of or obtains the current outside temperature, it can determine or infer whether or not it is indoors or outdoors. Outside temperature information can be obtained from a database of worldwide outside temperature data maintained based on hourly updates from, for example, the American National Oceanic and Atmospheric Administration's (NOAA's) National Weather Service (NWS). If the device's ambient temperature is within a range of normal inside temperatures, and if the outside temperature is significantly different, then there is a high probability that the device is inside. If, on the other hand, the device's ambient temperature is closer to the local outside temperature, then the device is more likely outside.

One attractive characteristic of this technique is the simplicity of the required sensing. Temperature can be measured easily with a small inexpensive sensor that draws power from the mobile device. Knowledge of outside temperature typically requires that the device obtain information as to its general location. But, typically since temperature varies marginally across relatively long geographic distances, the location estimate need not be extremely accurate. For example, the system can use location information described in terms of U.S. postal codes. In another implementation, the location information can be derived by GPS (Global Positioning System) location techniques. Such approximate location metrics can often provide temperature information suitable for making determinations described herein.

While it is clear that determining device location by temperature differentiation can be difficult in locations where the inside and outside temperatures have little differentiation, the disclosed technique still provides a high degree of correctness by reasoning mathematically about the temperature distributions, a probability of being inside, which reflects the uncertainty caused by similar inside and outside temperatures.

The certainty of inside/outside inferences is strongly related to the certainty of three different temperature distributions: measured ambient temperature from the device, expected inside temperature, and outside temperature interpolated from weather stations. These distributions are combined mathematically to create a probability estimate of being inside or outside.

It is noted other kinds of containment within indoor and outdoor locations are contemplated to enhance the accuracy of inferences about indoor and outdoor, and such considerations as the role of the sensed temperature at a device, and the typical indoor temperatures, and the current measured outdoor temperature. For example, it can be considered whether the device is likely to be inside an automobile based on the signals from accelerometers, and thus interpret appropriately the signals about the difference between typical indoor temperatures and the current outdoor temperature in a region. Likewise, the output of accelerometers, the time of day and the amount of light reaching a photosensor on a device, as well as the differences in the temperatures on different facades of a device via the use of multiple temperature sensors are within contemplation of the subject invention to determine whether a device is in a person's pocket, thus changing the interpretation of differences between the measured outdoor temperature and indoor signals, and inferences about the overall context.

FIG. 1 illustrates a system 100 that determines device context in accordance with the subject invention. The system 100 includes one or more sensors 102 (denoted CONTEXT SENSOR$_1$,CONTEXT SENSOR$_2$, . . . , CONTEXT SENSOR$_N$) that measure physical differences between inside and outside environments. For example, one sensor can be a temperature sensing device. Another can be a pressure sensing device for sensing changes in altitude. The one or more sensors 102 communicate sensor data to a context computing component 104 over a pathway 106 for processing and deriving the probability estimate. The one or more sensors 102 and context computing component 104 can be employed in the device such that all sensing and processing is performed conveniently and quickly. Note however, that such one or more sensors 102 need not be in the same enclosure as the context computing component 104, but can be operated in wireless communications therewith over the pathway 106.

In one implementation of the context architecture, a GPS receiver can be automatically turned off or put into a mode where the device only turns on periodically to see if it can sense GPS signals, and if it does not sense GPS, turns itself off after the brief periodic probes, when it is determined that it is likely that the device is inside a building, because GPS does not typically work inside, thus saving power. Other sensing, via ambient sources or via specialized embedded sensing can be used to guide policies for changing a power-saving policy. For example, accelerometers can be combined with the inference and such policies as turning off a GPS receiver because the absence of sensed motion after a system is determined to be inside means that it is likely that the system is still inside. Sensing motion via accelerometers or the sensing of sudden changes in light, or changes in such ambient signals as the strength of wireless signals (e.g., IEEE 802.11), the strength of commercial AM or FM radio transmissions, or even changes in the amplitude of electromagnetic hum from nearby power systems or lines, can raise the likelihood of a context changing from inside to outside, and thus can be used to turn on a GPS system or temporarily increase the frequency of probes for GPS signals, in a device that had either been turned off or put into a low-frequency intermittent probe mode.

Additionally, knowing a person's context can be important for invoking automatic behaviors on the device. As one example, if a person is scheduled for a meeting that may or may not be attended, but the context is that he/she is outside, the person is likely not in a meeting, indicating that the person may be less busy than he or she would have been if they were attending an indoor meeting that is scheduled on their calendar. Thus, the person may be more available for receiving a telephone call on that person's cell phone.

In another example, the context architecture can be useful for adding metadata to digital photos potentially serving as a way to filter photos in a search, and as a component of higher-level context inference for ubiquitous computing. For example, an assertion about whether a picture was taken indoors or outdoors or a likelihood that a user was indoors can be encoded in metadata, and if indoors, a database of potential locations based on the latest sensed GPS location can be used to add a single or multiple candidate locations to the metadata. In one conception, such metadata can be used to allow user's to disambiguate a location for a set of pictures by changing a location guess to an assertion for a set of images. Such metadata about indoor and outdoor likelihoods can be combined with image-based classification about whether a picture represents an indoor or outdoor scene.

The availability of GPS signals is also a valuable signal about whether a user is indoors or outdoors. However, the lack of GPS signals can occur outside as well as inside because of GPS signal "shadows" caused by obstructions such as a building. The lack of GPS signals can be combined with historical maps of GPS shadows that have been logged in the past to guide the interpretation of the lack of GPS signals in inferring whether or not a device is inside or outside. Such signals can be used in conjunction with other ambient signals.

Figure 2:
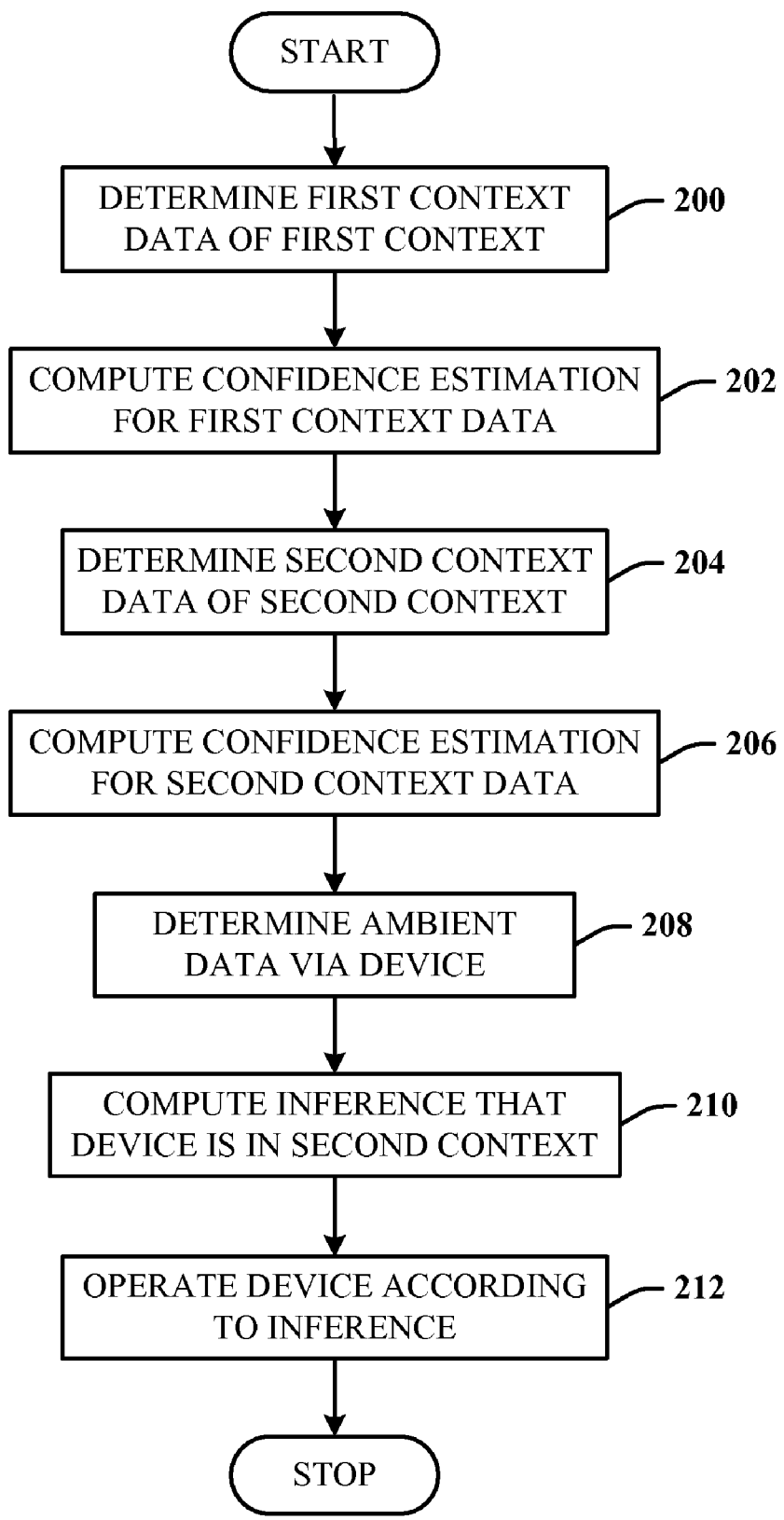
FIG. 2 illustrates a methodology of differentiating between inside and outside in accordance with the invention.

Referring now to FIG. 2, a methodology for differentiating between inside and outside in accordance with the invention is described. While, for purposes of simplicity of explanation, the one or more methodologies shown herein, e.g., in the form of a flow chart, are depicted and described as a series of acts, it is to be understood and appreciated that the methodology(s) are not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, context data of a first context is determined. At 202, a confidence estimation is computed from the second context data. At 204, context data of a second context is determined. At 206, a confidence estimation is computed from the second context data. At 208, the ambient data (e.g., temperature is determined via the device. At 210, a probability estimation is computed which provides an inference of whether the device is inside or outside. At 212, the device or its components are then operated accordingly.

Figure 3:
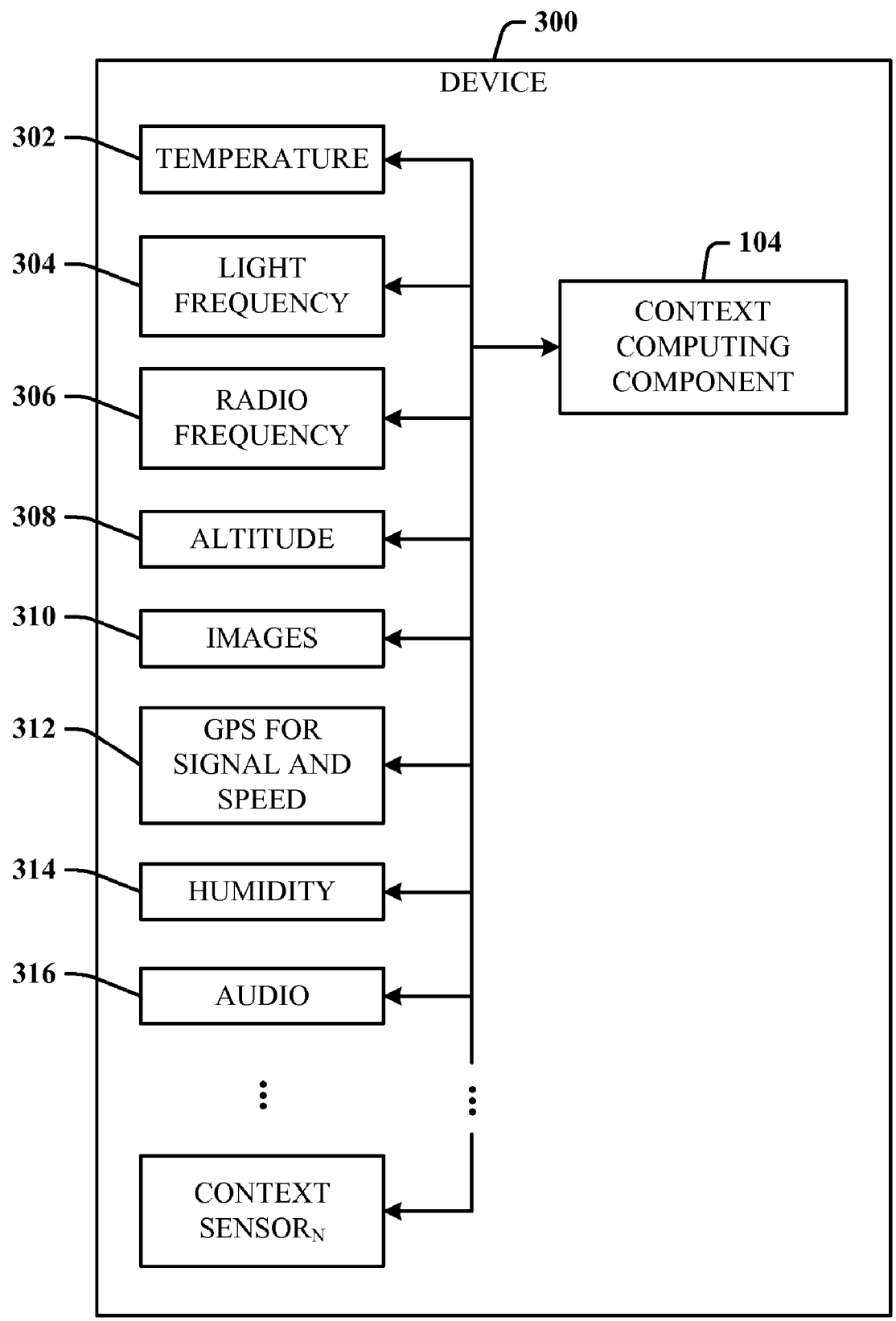
FIG. 3 illustrates shows a device that employs one or more sensors and the context computing component for inside/outside determination according to the invention.

FIG. 3 illustrates a device 300 that employs one or more sensors and the context computing component 104 for inside/outside determination. A variety of sensors can be used collectively and/or as subsets thereof to facilitate discriminating inside from outside. At 302, a temperature sensor is used—inside building temperatures are normally artificially maintained in a range comfortable for their human occupants. Outside temperatures vary with location and the local weather, and can be determined by consulting updated temperature data maintained on the Internet. The device measures ambient temperature and can consult a web service to determine the outside temperature at its location.

Location data can be manually entered or determined from GPS or other location-measuring device. If the measured ambient temperature is significantly different from the outside temperature, and if the measured ambient temperature is in the range of normal inside temperatures, then the device is likely inside. If the measured ambient temperature is close to the local outside temperature, and if this temperature is significantly different from the normal range of inside temperatures, then the device is likely outside. If the measured ambient and outside temperatures are in the range of normal inside temperatures, then the inside/outside determination is uncertain.

At 304, light frequency can be measured. The color of typical inside and outside light is different. Outside, sunlight is received directly or filtered through clouds or haze. Inside, sunlight is filtered through windows, and much inside light is generated artificially. A sensor that measures the local illumination spectrum can serve as an input to an algorithm that reasons about typical spectra of inside and outside light to discriminate inside from outside. At 306, radio frequency information can be sensed. Buildings are normally bathed in 60 Hz signals or "hum" (50 Hz in some countries) that is generated inadvertently by alternating current (AC) carrying wiring and devices. Except for near power lines, outside does not experience this hum as strongly. Thus, measuring the strength of 50/60 Hz hum can be used to discriminate inside from outside.

At 308, a change in altitude can be used to determine if the device is inside or outside. A pressure sensing device (e.g., a barometer) can be used as a means for testing altitude. If the altitude differentiation changes in a relatively short period of time, the device is likely in a structure. At 310, imaging information can be captured and processed using a camera. Inside, looking up normally gives a view of a ceiling, while outside looking up normally gives a view of the sky. Thus, computer vision techniques can be used to discriminate the color and normally structured patterns of an inside ceiling from the color and unstructured patterns of the sky based on a camera image taken from the device.

At 312, GPS information can be utilized in at least two ways. GPS typically fails inside buildings or structures. If it does fail, this is a good clue that the device is inside, although failures also come from foliage and other overhanging objects. Additionally, two adjacent GPS readings can be used to compute the device's speed. If the speed is greater than a predetermined threshold, the device is likely not inside, but outside on a bicycle or in a car, for example.

At 314, humidity measurements can be used. Typically, there is a marked change from inside and outside humidity. Buildings are conditioned to maintain comfort for its occupants or an environment for equipment, or both, which can also have a significant effect on the humidity. Thus, a humidity sensor can be used to differentiate between inside and outside. At 316, audio signals can be used. Sounds unique to inside consist of droning machines like fans from HVAC, refrigerators, and computers. Unique outside sounds consist of wind, passing vehicles, and chirping birds. Processing these audio "scenes" can be used to detect the unique sounds and to discriminate inside from outside. In a more robust implementation, echoes can be sensed as a means for determining inside from outside.

Probability distributions are employed to determine a probability inference that the device is located inside or outside. One advantage of the disclosed probabilistic formulation is that the technique accurately reports its own confidence in the classification. The inside/outside inference is a function of three different temperatures: the measured ambient temperature, the outside temperature, and the inside temperature. All three are described by probability distributions that are used to compute the probability of being inside. A description of how the three probability distributions are derived is described below. Note that the probabilistic inference described herein takes a closed form if the three probability distributions are Gaussian. Thus, the distributions are modeled as such herein, although this is not a requirement.

Figure 4:
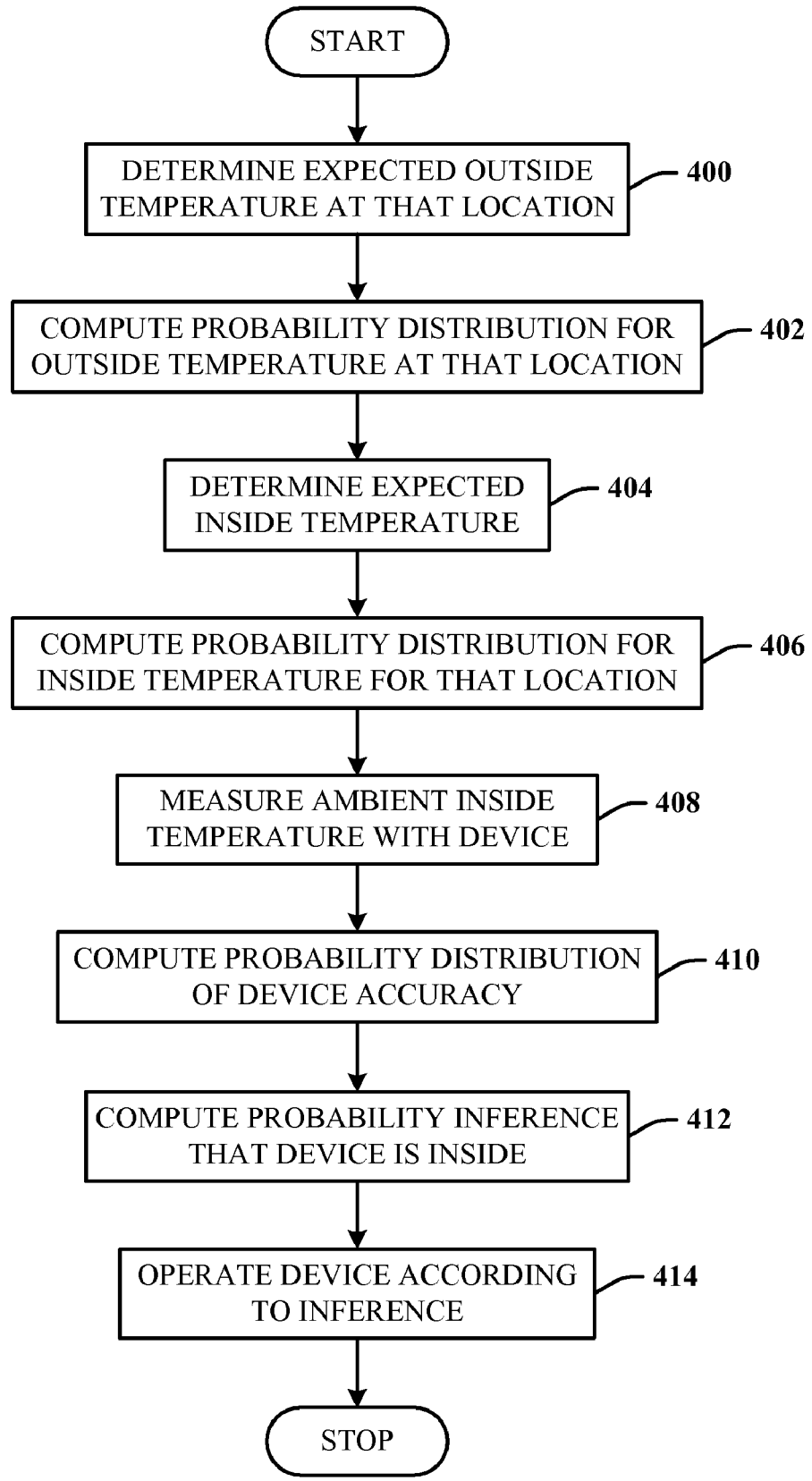
FIG. 4 illustrates a methodology of deriving probability distributions when using temperature as a means for determining device context in accordance with the invention.

FIG. 4 illustrates a methodology of deriving probability distributions when using temperature as a means for determining device context. At 400, the device is moved to a location, and the expected outdoor temperature for that location is determined. As indicated supra, this can be accomplished by accessing a weather database for weather information at the location of the device. For example, the zip code at the device location can be used to retrieve weather information. At 402, a probability distribution for the outside temperature at that location is computed. At 404, the expected inside temperature is determined. At 406, a probability distribution for the inside temperature at that location is computed. At 408, the device measures the ambient inside temperature. At 410, the probability distribution for the device accuracy is then computed. At 412, all three distributions are used to compute a probability inference that the device is inside. At 414, the device is operated according to the inference.

Figure 5:
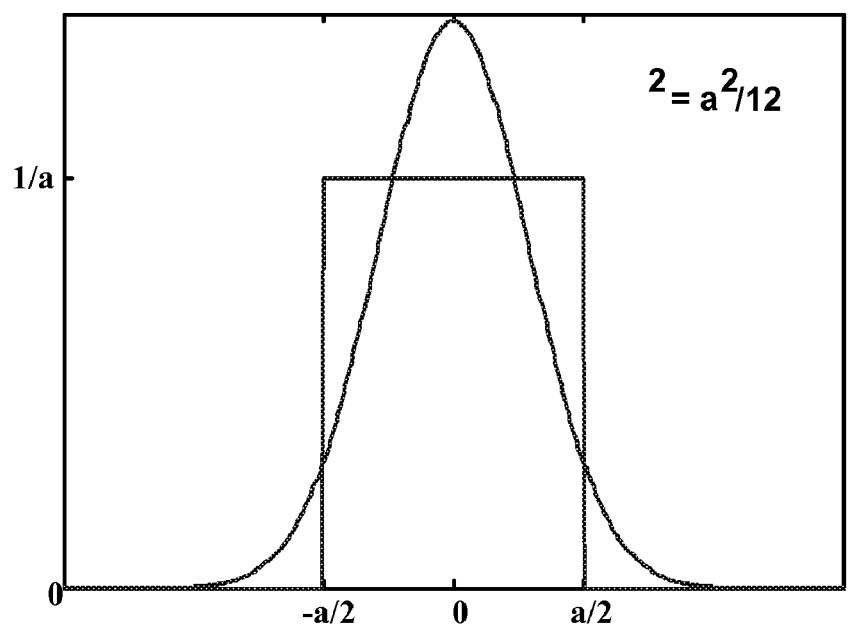
FIG. 5 illustrates the probability distribution for the temperature sensor.

As an example of the temperature application, a thermometer was used having an advertised accuracy of ±0.28° C. over a range of −28.9° C. to 48.9° C. (−20° F. to 120° F.). The uniform distribution for this sensor over ±0.28° C. is assumed to be a Gaussian distribution with the same variance. FIG. 5 illustrates a Gaussian probability distribution with a same mean and variance which can be utilized for the temperature sensor. The variance of a uniform distribution over [a,b] is $$\sigma^2 = \int_a^b x^2 / (b-a) dx = (b-a)^2 / 12 \tag{1}$$

From the thermometer's accuracy specification, (a,b)=(−0.28° C., 0.28° C.), giving $\sigma_m$=0.162. Thus, the distribution of actual temperatures $t_a$ is $t_a \sim N\{t_m, \sigma_m^2\}$, where $t_m$ is the temperature measured with the mobile device, and $N\{\mu, \sigma^2\}$ represents a normal distribution.

The inside temperature of a building of interest can be measured with an inside thermometer connected to a network and used as part of the system. This requires extra infrastructure, however, so dependence herein is on the fact that building temperatures normally vary over only a small range. Buildings are usually temperature-controlled for the comfort of their occupants, with obvious exceptions for saunas, wine cellars, etc. In lieu of temperature data from a large sample of buildings, an ISO standard 7730 provides that temperatures of commercial buildings are limited to 20-24° C. in winter and 23-26° C. in summer. Thus, the temperature range (a,b)=(20° C., 26° C.) can be modeled as a normal distribution with a variance of Equation (1) above and a mean that splits the range. This results with $\mu_{in}$=23 and $\sigma_{in}$=1.732, with inside temperature $t_{in}$ distributed as $t_{in} \sim N\{\mu_{in}, \sigma_{in}^2\}$.

One manner to obtain the local outside temperature is to equip areas of interest with networked-connected thermometers. For instance, if a nursing home desired to monitor if any of its residents left the building, it could use a thermometer installed immediately outside. Another method is to exploit thermometers that are already in place. There are approximately 6510 weather stations located around the world. Hourly updates from these stations are gathered by the American NOAA's National Weather Service and made available as METAR reports. A server can be provided that accesses and stores the latest data from each of these stations by hourly downloading the latest METAR summary file.

As part of the inside/outside inference, the user specifies the device location in order to compute the outside temperature. Since temperature varies only slowly as a function of location, the measured location does not need be highly specific (an approximate location can provide suitable temperature data). It is sufficient to obtain the last known latitude/longitude reading from a GPS receiver or, in the U.S., the postal code which can be converted to the latitude/longitude via a web service that accesses a database of postal codes and associated latitude/longitude information.

Given a latitude/longitude reading, interpolation can be used to compute the local temperature. In one implementation, a choice of interpolation scheme is optimal inverse distance weighting. This technique interpolates temperature at a point of interest as a weighted average of all the known temperatures. The weights are the reciprocals of the distances between the known points and the point of interest, raised to some power that is computed by experiment. It is to be appreciated, however, that other interpolation schemes can be used. Mathematically, the outside temperature $t_{out}^{*}$ is computed as $$t_{out}^{*} = \frac{\sum_{i=1}^{n} t_i / d_i^r}{\sum_{i=1}^{n} 1/d_i^r}, \quad (2)$$

where $t_i$ is the temperature reported from the $i^{th}$ weather station, $d_i$ is the distance between the point of interest and the $i^{th}$ weather station, n is the number of weather stations, and r is the experimentally determined optimal exponent. $d_i$ can be computed because the METAR reports give the (latitude, longitude) of each weather station.

Figure 6:
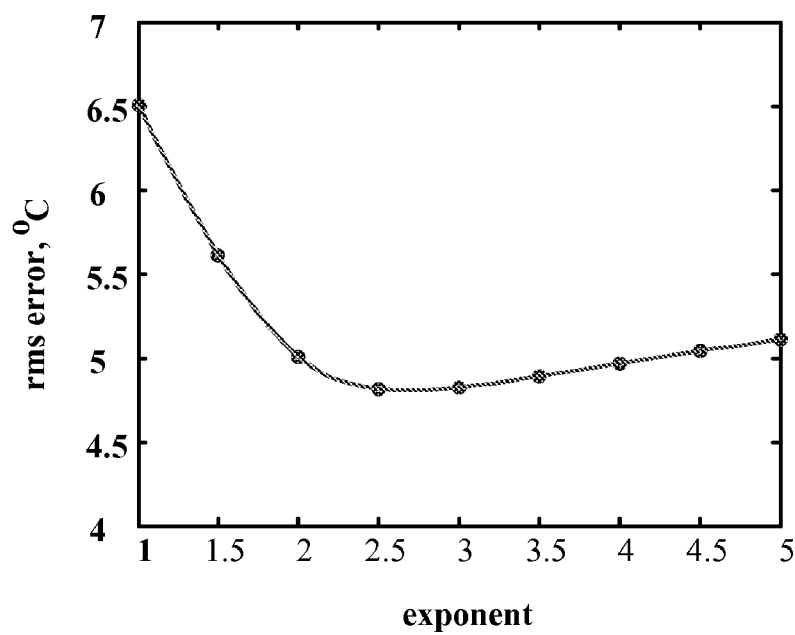
FIG. 6 illustrates a graph of RMS temperature error as a function of a weighting component that gives an optimal exponent.

The best r is computed based on twenty-four consecutive hours of temperature data from all the weather stations, excluding the inevitable missing reports from some stations. For each hour time slice, a leave-one-out procedure is used to estimate the interpolation error. Leaving out one weather station, all of the other weather stations are used to estimate its temperature. Taking each station and each hour in turn, an RMS interpolation error is computed. By exhaustively searching through different values of r, the minimum RMS exponent was determined to be r=2.65. FIG. 6 illustrates a graph of RMS temperature error as a function of a weighting component that gives an optimal exponent.

Figure 7:
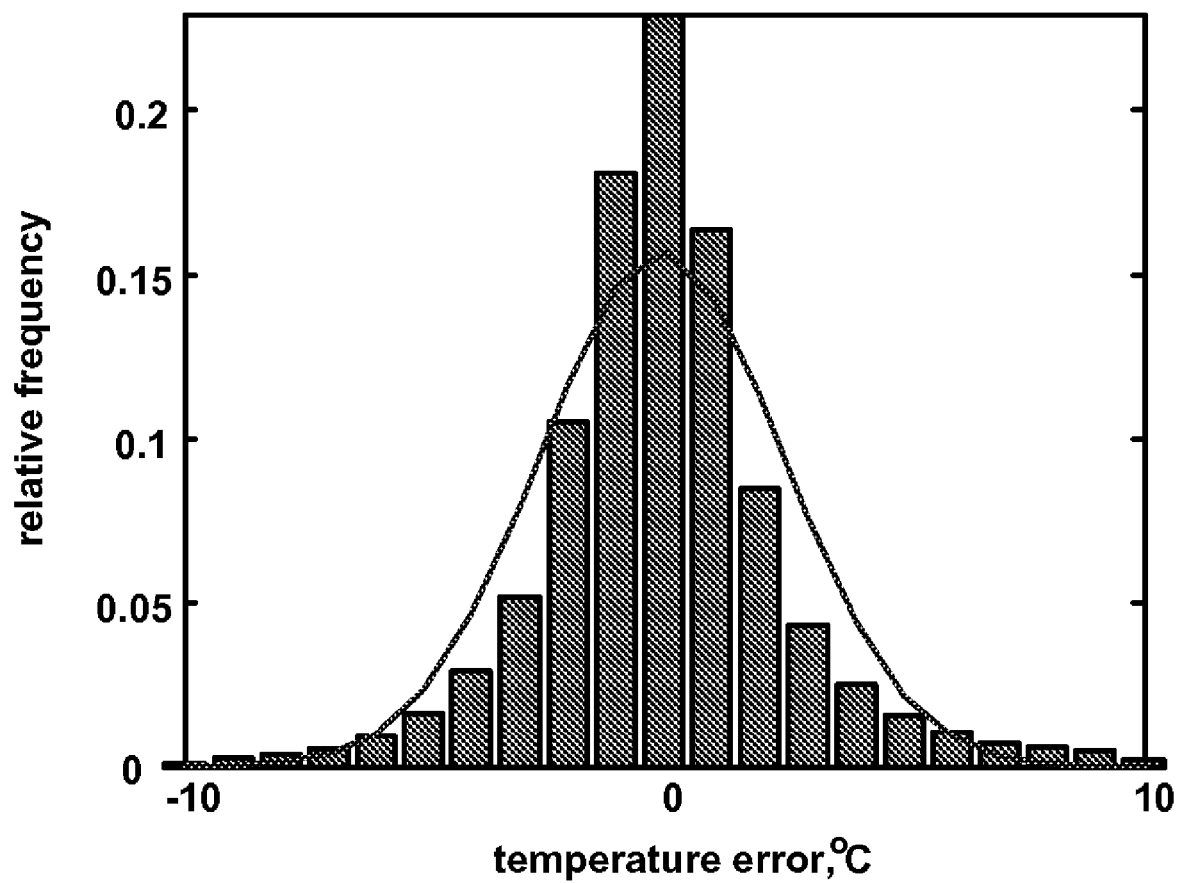
FIG. 7 illustrates shows a graph that represents a histogram of errors.

To estimate the error distribution of outside temperature, the same leave-one-out procedure can be used as above and a histogram of errors created. FIG. 7 depicts a graph that represents a histogram of errors. Errors above 10° C. and below −10° C., were eliminated before computing the error statistics, which amounted to about 3% of the data. This provides a better-fitting Gaussian distribution, also shown in FIG. 7. Since this error distribution has a mean of approximately zero (actually −0.4° C.), and a standard deviation of $\sigma_{out}$=2.545, the distribution of interpolated outside temperatures is modeled as $$t_{out} \sim N\{t_{out}^{*}, \sigma_{out}^2\}, \quad (3)$$

where $t_{out}^{*}$ is the interpolated temperature for the given location.

In one implementation, two web services can be created to facilitate access to interpolated outside temperatures. The first web service, mentioned above, converts U.S. postal codes into latitude and longitude data. A second web service can employ latitude/longitude data and return the outside temperature using for example the interpolation equation (2) above.

Based on the three temperature distributions above, a goal is to derive an equation that provides the probability of being inside based on the measured ambient temperature and interpolated outside temperature. Using Bayes' rule, the probability of being inside, given the measured ambient temperature $t_m$, is:

$$p(in | t_m) = \frac{p(t_m | in)p(in)}{p(t_m | in)p(in) + p(t_m | out)p(out)} \quad (4)$$

For lack of any prior assumptions, it is assumed the prior probabilities p(in)=p(out)=0.5.

Measured Temperature Conditioned on Inside. The first state conditional probability in Equation (4) is $p(t_m|in)$, which is the probability of the measured temperature $t_m$ given that the device is inside. This is a function of the actual ambient temperature, $t_a$, which we do not know. The joint conditional probability distribution $p(t_m, t_a|in)$ is introduced, and the actual temperature integrated out to compute the desired probability:

$$p(t_m | in) = \int_{-\infty}^{\infty} p(t_m, t_a | in) dt_a \quad (5)$$

$$= \int_{-\infty}^{\infty} p(t_a | in) p(t_m | t_a, in) dt_a$$

The distribution $p(t_a|in)$, reduces to the normal distribution governing inside temperatures:

$$p(t_a | in) = p(t_a) \quad (6)$$

$$= N\{t_a; \mu_{in}, \sigma_{in}^2\}$$

where $N\{x; \mu, \sigma^2\}$ is the Gaussian density function:

$$N\{x; \mu, \sigma^2\} = \frac{1}{\sqrt{2\pi}\,\sigma} e^{-\frac{1}{2}\left(\frac{x-\mu}{\sigma}\right)^2} \quad (7)$$

The distribution $p(t_m|t_a, in)$ represents the accuracy of our thermometer, and reduces as follows:

$$p(t_m | t_a, in) = p(t_m | t_a) \quad (8)$$

$$= N\{t_a; t_m, \sigma_{in}^2\}$$

Continuing from equation (5) using the resultant normals from equations (6) and (8), the closed form is provided:

$$p(t_m | in) = \int_{-\infty}^{\infty} p(t_m, t_a | in) dt_a \quad (9)$$

$$= \int_{-\infty}^{\infty} p(t_a | in) p(t_m | t_a, in) dt_a$$

$$= \int_{-\infty}^{\infty} N\{t_a; \mu_{in}, \sigma_{in}^2\} N\{t_a; t_m, \sigma_m^2\} dt_a$$

$$= N\{\mu_{in}; t_m, \sigma_{in}^2 + \sigma_m^2\}$$

The last step comes from an identity, $$\int_{-\infty}^{\infty} N\{x; \mu_1, \sigma_1^2\} N\{x; \mu_2, \sigma_2^2\} dx = N\{\mu_1; \mu_2, \sigma_1^2 + \sigma_2^2\} \quad (10)$$

Equation (9) is intuitively satisfying in that the maximum of $p(t_m|in)$ occurs at the mean inside temperature $\mu_{in}$. The function broadens and falls with increases in the uncertainty of the inside temperature ($\sigma_{in}^2$) and the uncertainty of the measured temperature ($\sigma_m^2$).

Measured Temperature Conditioned on Outside. The other conditional probability from equation (4) is $p(t_m|out)$, which is the probability of the measured temperature given that the device is outside. Proceeding as above, the following closed form is derived:

$$\begin{aligned} p(t_m|out) &= \int_{-\infty}^{\infty} p(t_m, t_a|out) dt_a \\ &= \int_{-\infty}^{\infty} p(t_a|out) p(t_m|t_a, out) dt_a \\ &= \int_{-\infty}^{\infty} N\{t_a; t_{out}^*, \sigma_{out}^2\} N\{t_a; t_m, \sigma_m^2\} dt_a \\ &= N\{t_{out}^*; t_m, \sigma_{out}^2 + \sigma_m^2\} \end{aligned} \quad (11)$$

Inside/Outside Probability vs. Measured Temperature. Substituting equations (9) and (11) into (4) yields a closed form for the probability of being inside given a measured temperature and an interpolated outside temperature:

$$p(in|t_m) = \frac{N\{\mu_{in}; t_m, \sigma_{in}^2 + \sigma_m^2\}}{N\{\mu_{in}; t_m, \sigma_{in}^2 + \sigma_m^2\} + N\{t_{out}^*; t_m, \sigma_{out}^2 + \sigma_m^2\}} \quad (12)$$

And $p(out|t_m) = 1 - p(in|t_m)$. This is a closed form solution for computing the probability of being inside or outside based on these parameters, all in ° C.:

| | |
|---|---|
| $t_m$ | Temperature measured on mobile device |
| $\sigma_m = 0.162$ | Standard deviation of measured temperature |
| $\mu_{in} = 23$ | Mean of expected inside temperature |
| $\sigma_{in} = 1.732$ | Standard deviation of expected inside temperature |
| $t_{out}^*$ | Outside temperature interpolated from weather stations |
| $\sigma_{out} = 2.545$ | Standard deviation of outside temperature |

Thus, one need only provide the measured temperature value $t_m$ and the outside temperature value $t_{out}^*$ to arrive at the probability of the device being inside and outside.

Figure 8:
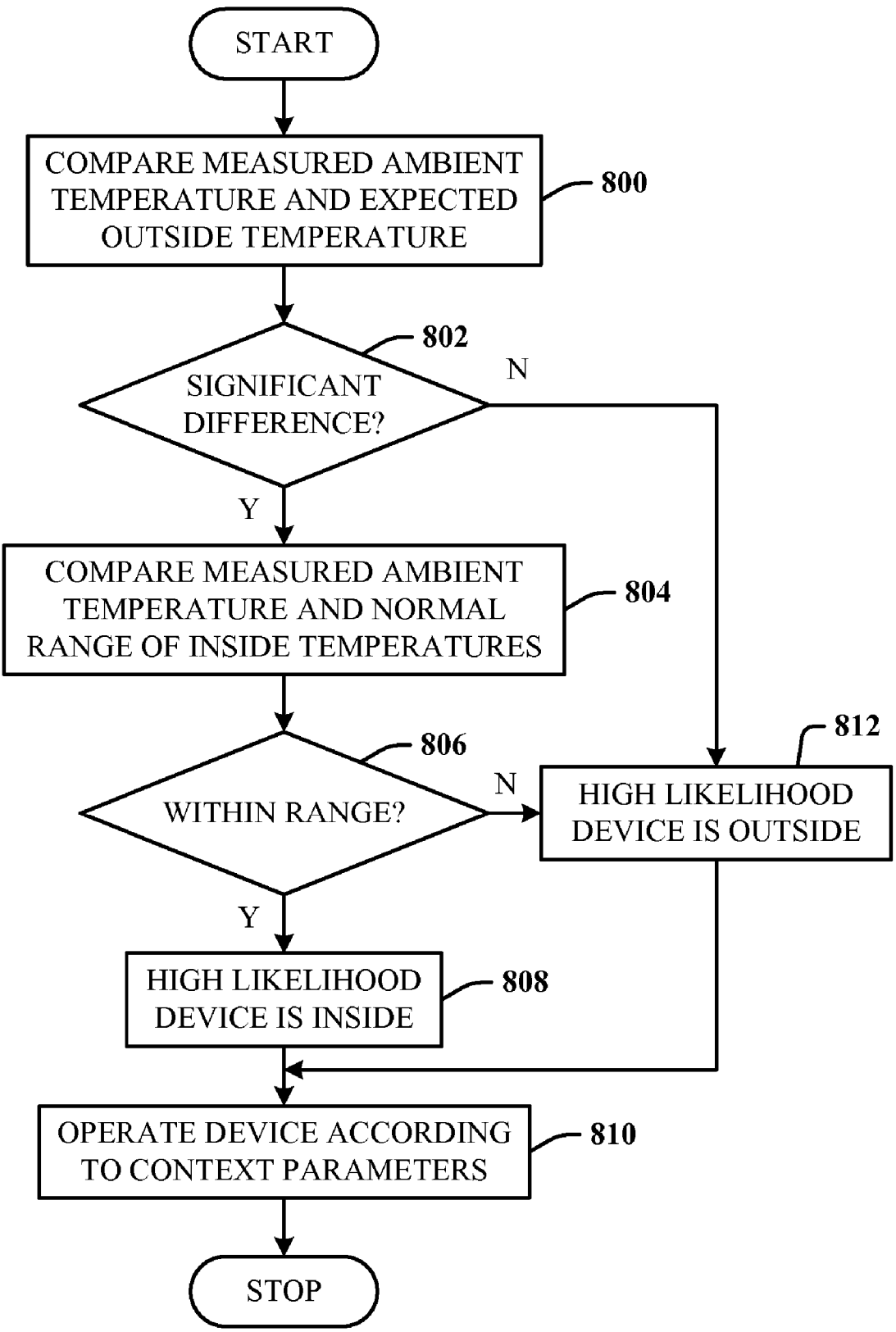
FIG. 8 illustrates an alternative methodology of deriving an approximation that classifies whether the device is inside or outside, in accordance with the invention.

FIG. 8 illustrates an alternative methodology of deriving an approximation that classifies whether the device is inside or outside in accordance with the invention. At 800, the probability distributions for the measured ambient temperature and the expected outside temperature are compared. At 802, if the difference is significant, at 804, the probability distributions for the measured ambient temperature and the normal range of outside temperatures are compared. At 806, if the resulting value is within a predetermined range of values, flow progresses to 808 where it is determined with a high probability that the device is inside. At 810, the device is then operated accordingly.

At 802, if the difference of the comparison performed at 800 is not significant, there is a high probability that the device is outside, as indicated at 812. Moreover, if the comparison at 804 indicates that the results are not within the predetermined range of values, there is a high probability that the device is outside, as indicated at 812. In either case, flow is to 810 to operate the device according to the context parameters.

Figure 9:
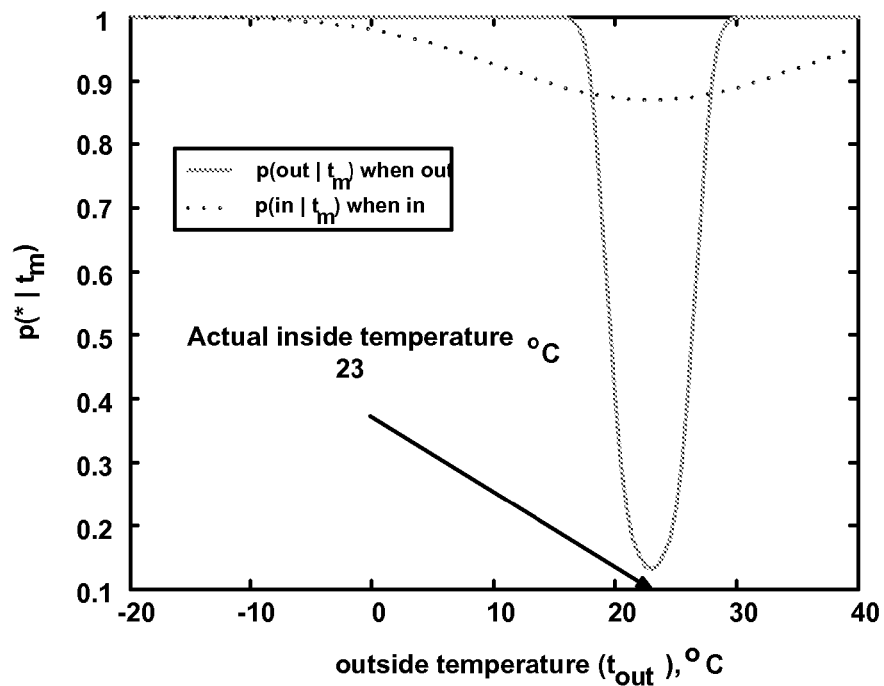
FIG. 9 illustrates the behavior of the equation as the outside temperature varies.

To demonstrate equation (12) in practice, two different people and associated devices are simulated using the technique, one inside and one outside. The ambient inside temperature is provided at $t_{in} = \mu_{in} = 23$, and the person inside measures it as exactly this value. FIG. 9 illustrates the behavior of the equation as the outside temperature varies from −20° C. (−4° F.) to 40° C. (104° F.), which the person outside measures exactly. The solid line shows the computed probability of the outside person being outside as the outside temperature changes. The probability remains high as long as the outside temperature is different enough from the inside temperature. As expected, the probability of being outside drops when the inside and outside temperatures are similar. The dotted line shows the computed probability of the inside person being inside. This probability also drops when the inside and outside temperatures are similar.

Figure 10:
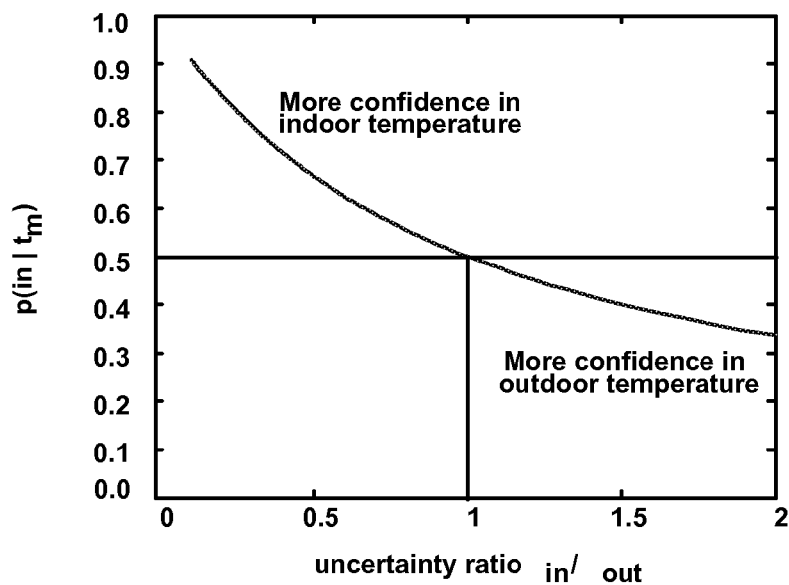
FIG. 10 illustrates of a graph that simulates an outside and inside temperature both equal to the mean inside temperature.

The simulation above confirms that the probabilities rise and fall as expected. The amount of rise and fall is a function of the temperature uncertainties. The probability of the inside person being inside never drops below 0.5, even when the inside and outside temperatures are equal. This is because the uncertainty of the outside temperature ($\sigma_{out} = 2.545$) is larger than the uncertainty of the inside temperature ($\sigma_{in} = 1.732$). Qualitatively, when the measured temperature is close to the expected inside temperature, the probability computation attributes more weight to the inside hypothesis, because the actual outside temperature can deviate more from the measured temperature than the inside temperature can. FIG. 10 illustrates a graph that simulates an outside and inside temperature both equal to the mean inside temperature $\mu_{in} = 23$. When the ratio $\sigma_{in}/\sigma_{out}$ is low, confidence in the inside temperature is higher, which biases the probability toward being inside. At $\sigma_{in} = \sigma_{out}$, the probability of being inside is 0.5. When $\sigma_{in}/\sigma_{out}$ grows beyond 1.0, the probability of being inside drops below 0.5.

Figure 11:
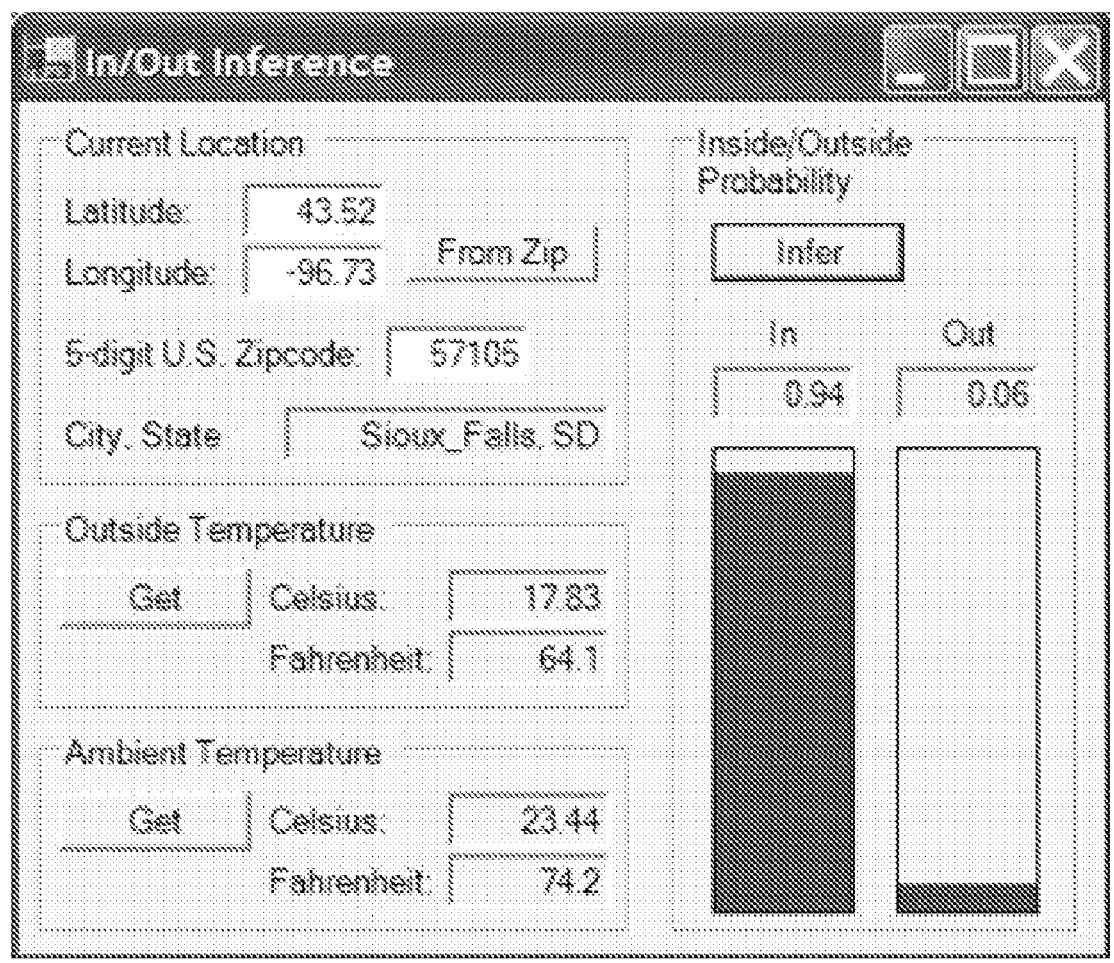
FIG. 11 illustrates a user interface that facilitates temperature-based inside/outside determination in accordance with the invention.

FIG. 11 depicts a user interface that facilitates temperature-based inside/outside determination in accordance with the invention. In the upper left the user provides the current location in the form of latitude/longitude data. Optionally, the user can input a U.S. postal code which is converted to latitude/longitude data via access to a web service. In the middle left box, the user clicks a GET button to call a temperature service for outside temperature data based on the latitude/longitude given above. In the lower left box, the user clicks a GET button to obtain an ambient temperature measurement from a connected temperature sensor. On the right, clicking an INFER button invokes the computation of equation (12) and the drawing of the bars indicating the probabilities of inside and outside. Here, the bars represent that there is a high probability that the device is inside.

Figure 12:
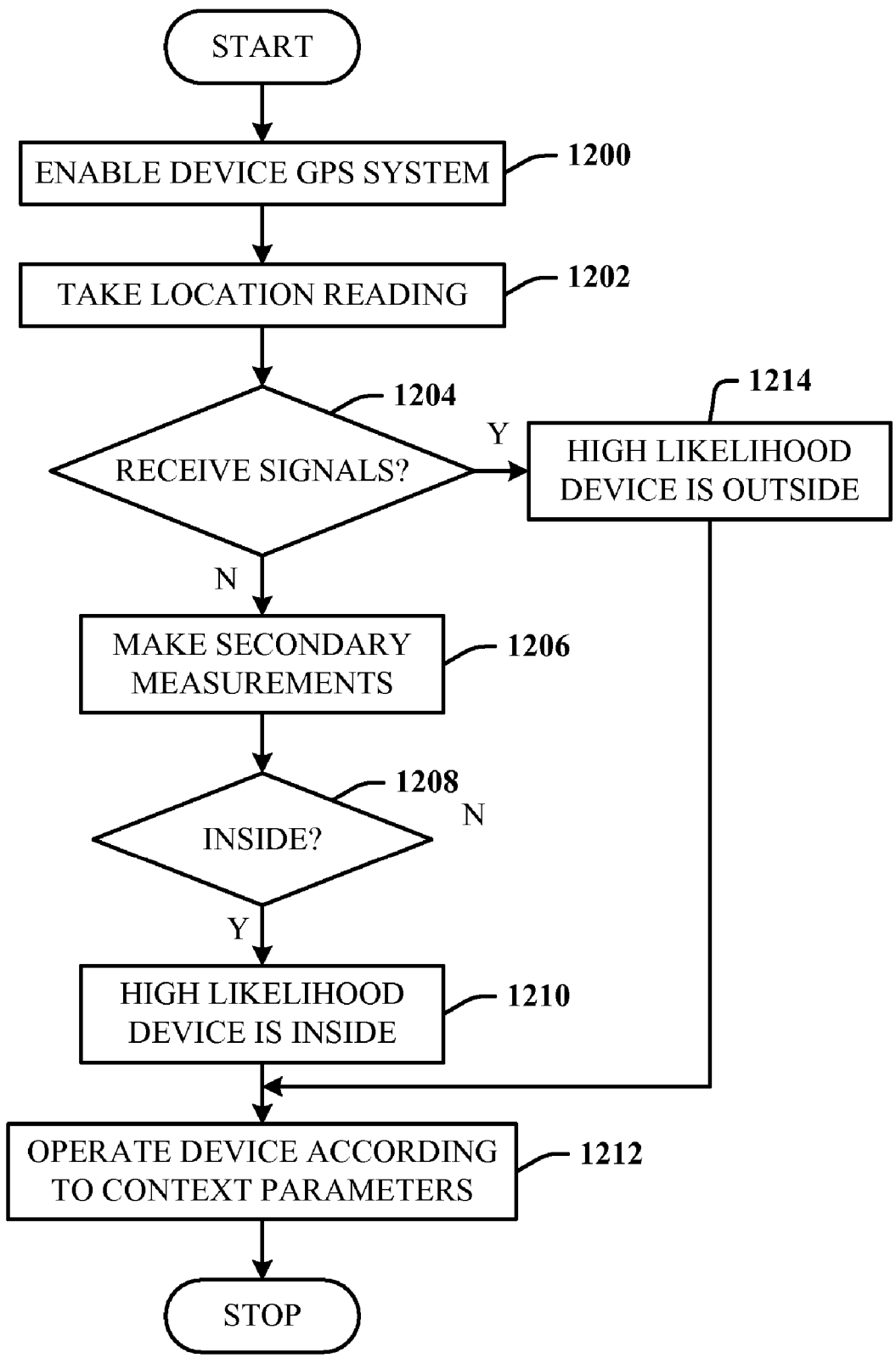
FIG. 12 illustrates a methodology of using GPS to determine the inside/outside location of a device based on the GPS signal, in accordance with the invention.

FIG. 12 illustrates a methodology of using GPS to determine the inside/outside location of a device based on the GPS signal. At 1200, GPS is enabled on the device. At 1202, GPS is used to make a location reading of the device. At 1204, the device determines if the location reading has been successful. If not, at 1206, secondary measurements can be made, although this is not necessary. If secondary measurements are made, at 1208, the device determines if the results of the secondary measurements indicate that the device is located inside. If the secondary results indicate so, at 1210, the system determines that there is a high probability that the device is located inside. The device is then operated according to the context parameters (being located inside), as indicated at 1212. If, at 1204, the GPS receiver receives signals, flow is to 1214 where the system determines that there is a high probability that the device is located outside. At 1212, the device is then operated according to the context parameters (being located outside).

Figure 13:
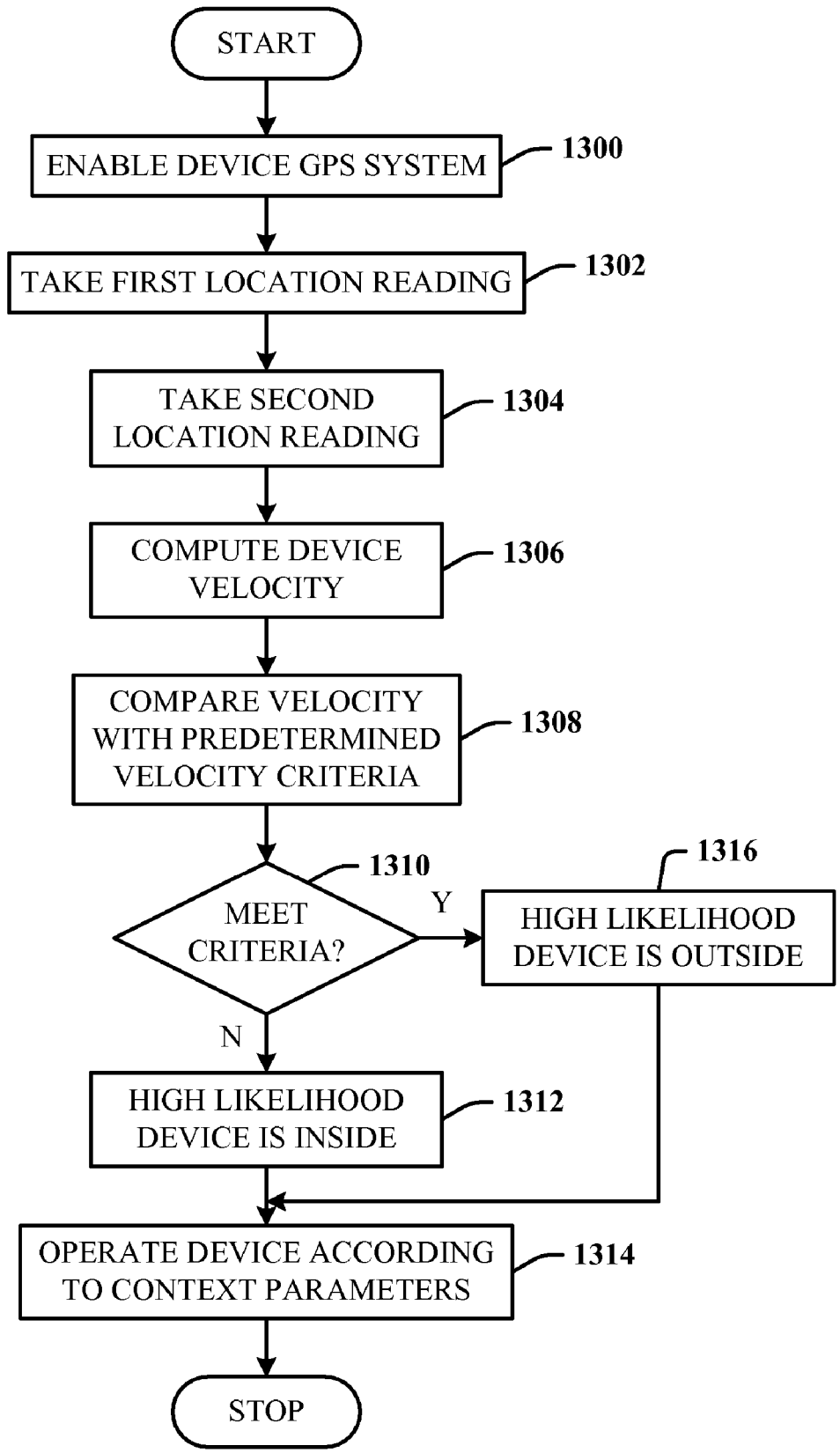
FIG. 13 illustrates a methodology of using GPS to determine the inside/outside location of a device based on speed, in accordance with the invention.

FIG. 13 illustrates a methodology of using GPS to determine the inside/outside location of a device based on speed, in accordance with the invention. At 1300, the device GPS system is enabled to receive GPS signals. At 1302, a first location reading is taken. Sometime later, a second location reading is taken, as indicated at 1304. At 1306, velocity is computed by the time differential between the location readings and the approximate distance derived from the two locations. At 1308, the computed velocity data can be compared to predetermined criteria that indicates the device is moving faster than what would normally be considered to be inside. At 1310, if the velocity data meets the criteria, there is a high probability that the device is located inside. Accordingly, at 1314, the device is operated as being inside. If the velocity information does not meet the criteria, flow is to 1316 where it is determined that there is a high likelihood that the device is located outside. At 1314, the device is then operated according to context parameters that indicate the device is outside. Note that these inferences can also be derived and utilized with the same probability analysis used for temperature hereinabove.

Figure 14:
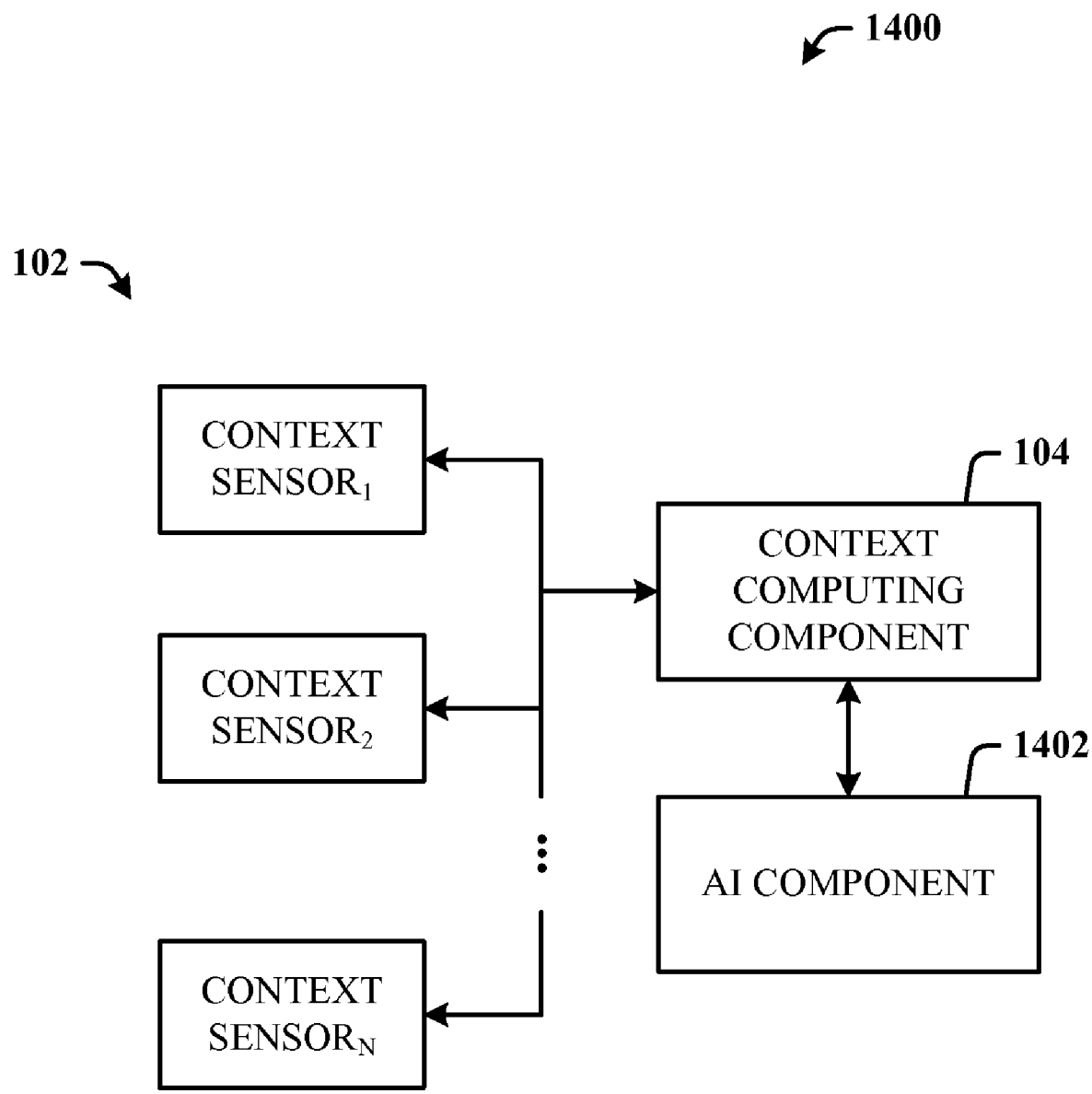
FIG. 14 illustrates a context computing system that includes artificial intelligence for learning and automating features thereof in accordance with the invention.

Referring now to FIG. 14, a context computing system 1400 is provided that includes artificial intelligence (AI) for learning and automating features thereof in accordance with the invention. An AI component 1402 interfaces to the context computing component 104 to facilitate analysis and automation of one or more feature based on sensor data of the sensor 102 and computations of the context computing component 104. The subject invention (e.g., in connection with selection) can employ various AI-based schemes for carrying out various aspects thereof. For example, a process for determining how many sensing devices to employ in a multi-sensor device can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g. via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions.

In one implementation with GPS capability, the AI component 1402 can facilitate expedited determination of whether the device is inside or outside based on the latitude/longitude data. For example, if the latitude/longitude data through repeated processes becomes associated with a location (e.g., the user's office) where the user takes the device from outside to inside many mornings at about the same time and takes the device from inside to outside in the evening, the AI component 1402 will learn this and at the expected time (either morning or evening), and according to measurements made, infer with a high probability that the device is being carried into (or out of) the office. This can add one more layer of inference to that which is derived as describer supra.

In another implementation where the device uses multiple sensors, it may be that the readings of some of the sensors yield poor results and others more accurate results for a given climate and location. Thus, the AI component 1402 can be employed to further analyze the sensor data and decide which sensor data to believe, and which to not believe.

Figure 15:
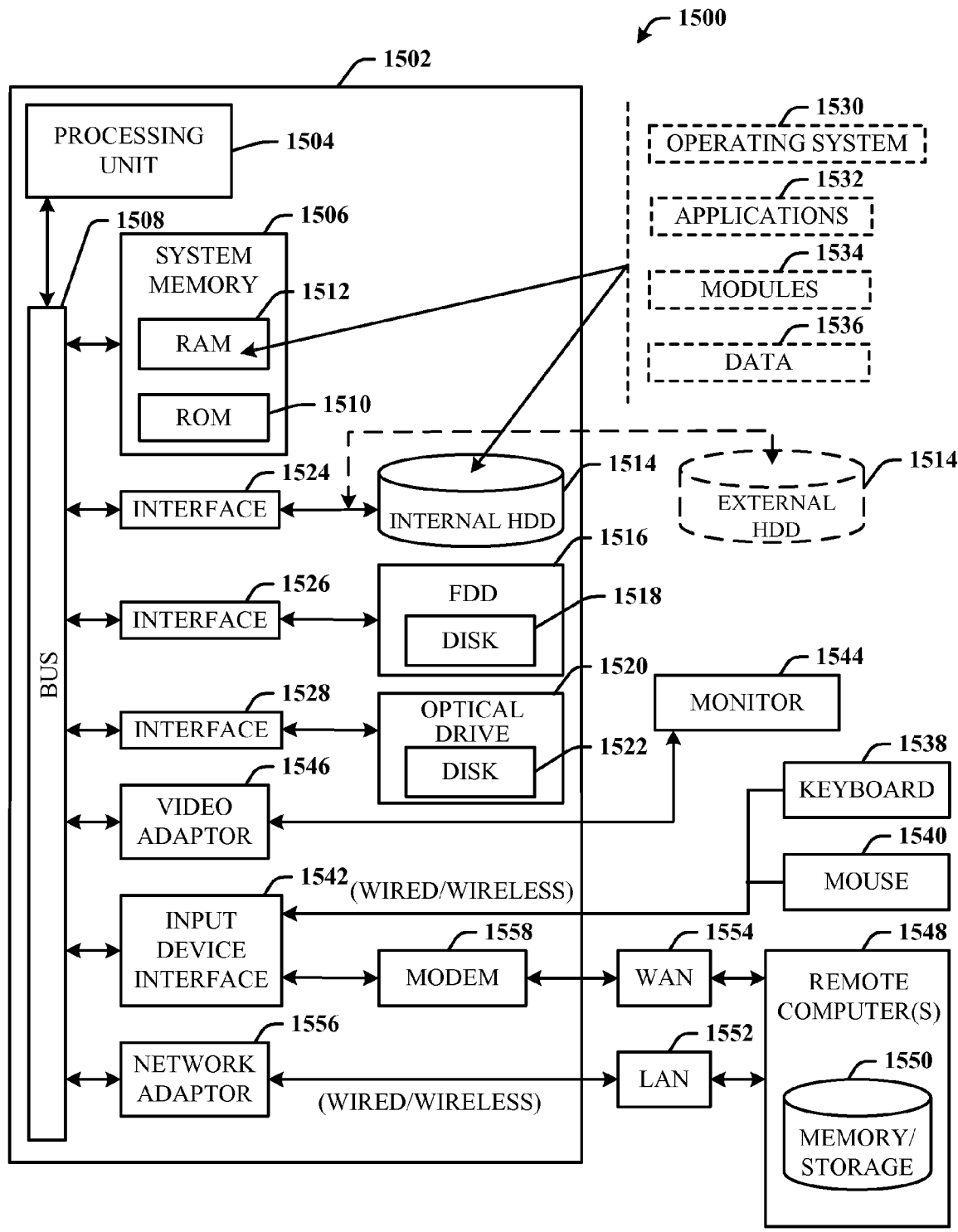
FIG. 15 illustrates a block diagram of a computer operable to execute the disclosed architecture.

Referring now to FIG. 15, there is illustrated a block diagram of a computer operable to execute the disclosed architecture. In order to provide additional context for various aspects of the subject invention, FIG. 15 and the following discussion are intended to provide a brief, general description of a suitable computing environment 1500 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, there is illustrated an exemplary environment 1500 for implementing various aspects of the invention that includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the invention can be implemented with various commercially available operating systems or combinations of operating systems.

A user can enter commands and information into the computer 1502 through one or more wired/wireless input devices, e.g. a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g. a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data insides and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 16:
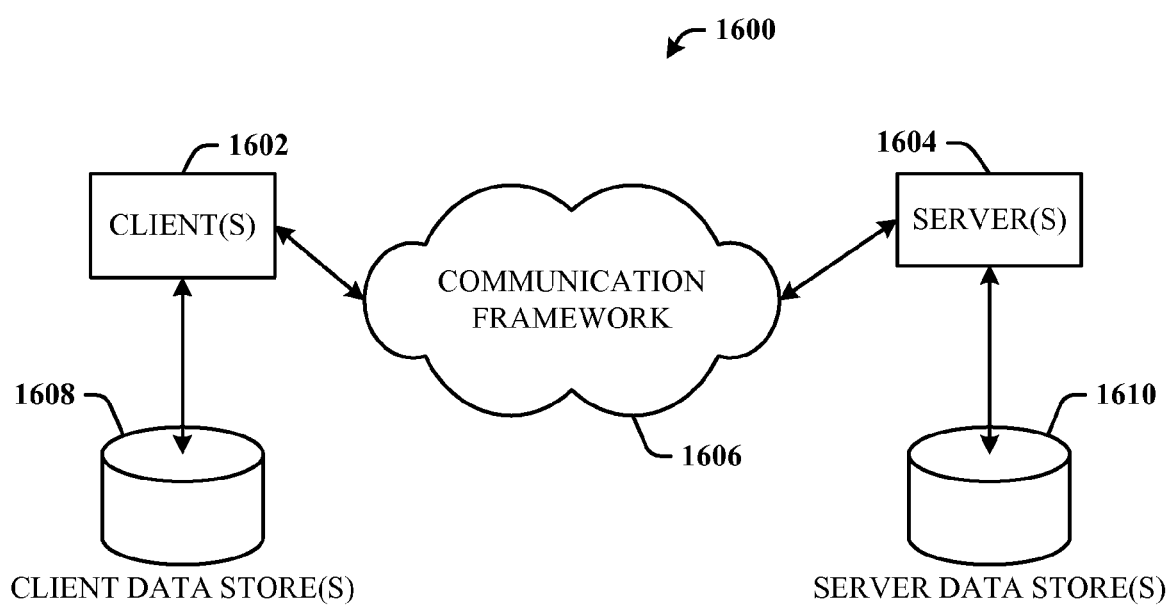
FIG. 16 illustrates a schematic block diagram of an exemplary computing environment in accordance with the subject invention.

Referring now to FIG. 16, there is illustrated a schematic block diagram of an exemplary computing environment 1600 in accordance with the subject invention. The system 1600 includes one or more client(s) 1602. The client(s) 1602 can be hardware and/or software (e.g. threads, processes, computing devices). The client(s) 1602 can house cookie(s) and/or associated contextual information by employing the invention, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates determination of a device context, comprising:
   a context sensor that measures a parameter of a first context of a device; and
   a context computing component that interfaces to the context sensor and facilitates determination of a change from the first context to a second context, wherein knowledge of such context transition is used to save power in certain devices by powering the devices off; and
   wherein the context sensor is part of a sensing system that includes a GPS subsystem which is activated periodically to sense GPS signals, where the absence of GPS signals facilitates powering the GPS subsystem into a mode where the GPS subsystem only turns on periodically to probe for GPS signals and if no signals are sensed, the GPS subsystem is turned off after the periodic probes.

2. The system of claim 1, wherein the context sensor senses at least one of temperature, humidity, and pressure.

3. The system of claim 1, wherein the context sensor senses at least one of electromagnetic wave frequency and images.

4. The system of claim 1, wherein the context computing component infers that the device is inside or outside.

5. The system of claim 1, wherein the context sensor includes a GPS (Global Positioning System) receiver that facilitates determining the first context of the device based on receiving a GPS signal.

6. The system of claim 1, wherein the context sensor includes a GPS receiver that facilitates determining speed of the device based on receiving GPS location signals from at least two locations.

7. The system of claim 1, wherein the parameter measured by the context sensor powers on at least one of a GPS subsystem of the device and the device.

8. The system of claim 1, wherein the parameter indicates that a user of the device is available for interactive communications.

9. The system of claim 1, wherein data the represents the change from the first context to the second context is used to add metadata to a digital photograph.

10. The system of claim 9, wherein the metadata is used to filter the digital photograph from a plurality of photographs during a search process.

11. The system of claim 9, wherein the metadata includes information related to whether the photograph was taken indoors or outdoors.

12. The system of claim 1, further comprising an artificial intelligence component that employs a probabilistic and/or statistical-based analysis to prognose or infer an action that a user desires to be automatically performed.

13. A computer readable medium having computer-executable instructions for performing a method of determining context of a portable computing device, comprising:
    measuring a first parameter of a first context of the portable computing device;
    determining a second parameter of a second context of the portable computing device; and
    computing a probability inference based on the first and second parameters that the portable computing device moved from the first context to the second context and turning off a component of the device based on the inference;

wherein location information is longitude/latitude data that is automatically accessed via a network and entered to facilitate determination of the device context.

14. The computer readable medium of claim 13, further comprising accessing at least one of GPS and weather information to derive the probability inference.

15. A method of determining context of a portable computing device, comprising:

determining a probability distribution of a first temperature of a first context of the portable computing device;

measuring a second temperature of a second context of the portable computing device; and computing a probability inference based on the first and second temperatures that the portable computing device moved from the first context to the second context, wherein the probability inference is determined from at least one of a measured ambient temperature, and expected temperature inside a structure, and a temperature outside the structure derived from interpolation, and wherein the temperature outside the structure is derived by accessing longitude/latitude data.

16. The method of claim 15, wherein the first temperature is determined outside of a structure by accessing weather information associated with a geographic location of the first context.

17. The method of claim 15, wherein the first temperature is determined outside of a structure by interpolating weather information obtained by accessing weather stations.

18. The method of claim 15, further comprising deriving a probability distribution for an expected third temperature of the second context.

* * * * *